United States Patent [19]
Daniels

[11] Patent Number: 5,924,763
[45] Date of Patent: Jul. 20, 1999

[54] WING ASSEMBLY FOR DRAG RACERS

[75] Inventor: Eddie A. Daniels, Jacksonville, Fla.

[73] Assignee: Trac-Tech, LLC, Emerald Isle, N.C.

[21] Appl. No.: 08/838,878

[22] Filed: Apr. 9, 1997

[51] Int. Cl.[6] .................................................. B60J 1/00
[52] U.S. Cl. ........................ 296/180.1; 296/185
[58] Field of Search .................... 296/180.1, 185; 244/54, 207; 180/309, 903; 248/554, 555

[56] References Cited

U.S. PATENT DOCUMENTS

| | | | |
|---|---|---|---|
| 2,037,942 | 4/1936 | Stalker | 296/185 |
| 2,891,740 | 6/1959 | Campbell | 244/207 |
| 3,154,267 | 10/1964 | Grant | 244/207 |
| 3,724,784 | 4/1973 | von Ohain et al. | 244/207 |
| 3,829,044 | 8/1974 | Leslie et al. | 244/207 |
| 3,952,823 | 4/1976 | Hinderks | 180/309 |
| 5,061,007 | 10/1991 | Simpson | 180/903 |

FOREIGN PATENT DOCUMENTS

| | | | |
|---|---|---|---|
| 356601 | 3/1990 | European Pat. Off. | 244/207 |
| 977072 | 6/1942 | France | 244/207 |
| 27 26 507 | 12/1978 | Germany | 296/180.1 |
| 1071764 | 6/1967 | United Kingdom | 244/207 |

*Primary Examiner*—Joseph D. Pape
*Assistant Examiner*—Kiran Patel
*Attorney, Agent, or Firm*—Thomas C. Saitta

[57] ABSTRACT

A aerodynamic surface structure assembly for a high speed, high acceleration, motorized vehicle, such as a drag racer, having at least one aerodynamic wing with a camber surface positioned to create a down force on the vehicle, an engine producing high velocity exhaust, and exhaust gas channelling pipes or plenums, where the exhaust gas is passed directly across the wing to produce the down force. The assembly includes baffles to create laminar gas flow and a housing to prevent ambient air from flowing across the wing. Preferably, a pair of wings are provided, one wing being mounted in front of each rear wheel.

16 Claims, 5 Drawing Sheets

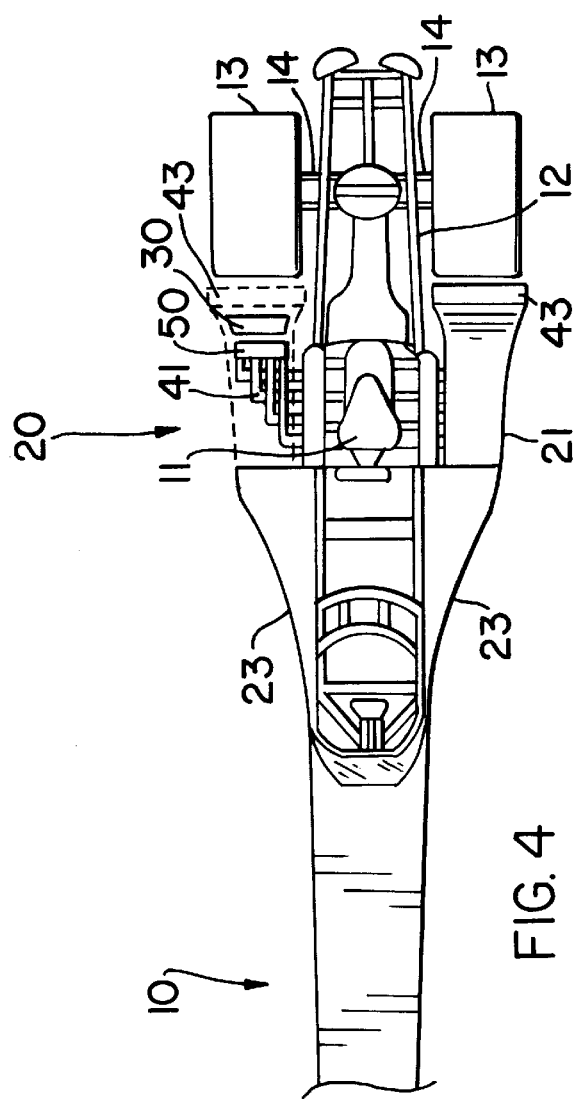
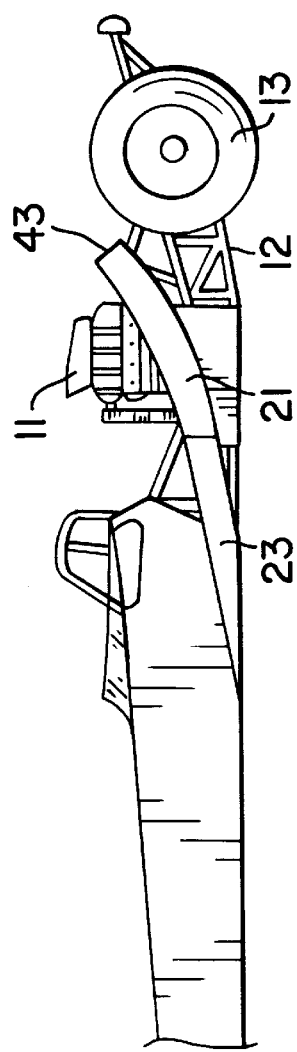
FIG. 4
FIG. 5

WING ASSEMBLY FOR DRAG RACERS

BACKGROUND OF THE INVENTION

The invention relates generally to the field of motorized land vehicles having aerodynamic surface structures, such as foils or wings, used to generate a down force on the vehicle to increase traction or handling characteristics. More particularly, the invention relates to land vehicles known as drag racing vehicles, where the exhaust flow from the engine creates the air passing across the aerodynamic surface structure.

The primary principle of drag racing vehicles is to cover a short distance, usually a quarter mile straight track, from a standing start in less time that an opponent in a parallel lane. This requires quick reaction time by both the driver and the vehicle to most effectively harness the power produced by the engine and transferred through traction generated by the tires. In the early days of drag racing the power available from the engines was limited and the tire industry produced tires of varying widths and tread design that were adequate to provide the required traction on the racing surface. As more powerful engines and better fuels were developed, the engine power was easily capable of causing traction loss, i.e., spinning tires, at the start and at any point on the track. When tires break traction, the acceleration of the car down the track is reduced, which increases the elapsed time for a run. The quest for higher performance led professional racing teams and car builders to develop clutch systems, drive trains and aerodynamic surfaces such as foils or wings in an attempt to harness the enormous power of the newer engines, which are capable of delivering from 3000 to 6000 horsepower from a 500 cubic inch engine, so that tire traction is maintained from the start and through out the race.

The introduction of wings, canards and air foils attached to the dragsters allowed for higher velocities and lower elapsed times, the aerodynamic surface structures creating a down force on the vehicle which increased traction during the race. Current technology provides for a large, three-section, highly cambered, high coefficient of lift wing of no larger than 1500 square inches mounted above the rear tires at a height no higher than 90 inches, with an additional wing mounted forward of the front wheels to offset the pitching moment about the lateral axis of the car caused by inertia and the down force of the rear wing. However, significant aerodynamic down forces are not generated until the vehicle achieves minimum velocities for a given wing design, which is a factor of the camber, surface area, coefficient of lift and other factors. Typically the down forces are not significant until the vehicle surpasses approximately 100 MPH. This means that the wings have no effect at the starting line, so that maintaining traction at the start and through the initial sub-100 MPH portion of the race is dependent on limiting the amount of power transferred to the rear tires by allowing the clutch system to slip until enough down force is generated by the aerodynamic surfaces.

There are additional disadvantages to the typical vehicle design utilizing a large rear wing. The typical design may result in "blow over" if the pitching moment from acceleration and traction exceeds the down force generated by the front wing. The current rules require that the rear wing must be stationary during the race, meaning that the angle of attack cannot be altered to present the optimum down force at a given speed. Thus the wing is positioned at an angle of attack which will generate down force at as slow a speed as possible, allowing more power to be supplied to the rear wheels early in the race. This angular position is more severe than would be required at high speeds and therefore results in excess down force and parasitic drag at high velocities which must be overcome by brute force of the engine. The very shape and size of the wings, along with the supporting and mounting structures, generate undesirable drag. Finally, since the air passing across the wings is ambient air, variations in temperature, altitude and other environmental factors will affect vehicle performance.

It is an object of this invention to provide a more stable dragster by focusing the down force generated by an aerodynamic structure, such as a wing, airfoil or canard, at a point just forward of the rear wheels, thereby creating a negative pitching moment and reducing the possibility of the vehicle blowing over, as well as obviating the need for a front wing. It is a further object to reduce induced and parasitic drag on the vehicle at high speed, to reduce elapsed time by generating a down force on the rear tires immediately upon throttle actuation, thereby increasing traction at the start, to provide for quicker vehicle reaction time through better traction at the start, to allow for a more efficient vehicle with reduced engine power, thereby increasing reliability, and to make irrelevant changes in atmospheric air density, temperature, and velocity in the air stream crossing the aerodynamic surfaces. It is a object to accomplish the above by providing one or more aerodynamic surface structures to create a down force on the rear tires, where the air flow across the aerodynamic surface structures which produces the down force is created by the relatively constant temperature, density and velocity of exhaust gas flow from the engine.

SUMMARY OF THE INVENTION

The invention is an improved motorized land vehicle, and in particular a high acceleration, high speed vehicle commonly referred to as a dragster or drag racing vehicle, the improvement residing in the provision of an aerodynamic surface structure assembly for creating down force to increase traction between the ground surface and the tires or wheels of the land vehicle, the aerodynamic surface structure assembly comprising one or more aerodynamic surface structures with a camber or curved surface and commonly referred to as a wing or air foil. The assembly comprises means to direct or channel the exhaust gases from the engine to the one or more wings, the channeling means further comprising flow altering means to alter the flow of the exhaust gases from turbulent flow to laminar flow prior to its reaching the one or more wings. The assembly preferably further comprises an external housing containing and enclosing the wings and the exhaust gas channeling means such that the wings are not exposed to ambient air flow during vehicle acceleration. In this manner the down force created by the wings is solely a result of the exhaust gas flow over the cambered surface.

Preferably the exhaust gas channeling means, which may comprise a number of individual conduit pipes, a plenum or a combination of the two and which is connected to each side of the engine and contain baffle members to alter the exhaust gas flow to produce laminar flow, is kept as short as possible to reduce back pressure on the engine. The gas channeling means end immediately in front of the leading edge of the one or more wings. To keep the gas channeling means short in length, it is preferred that at least two such gas channeling means and at least a pair of wings be provided, one for each side of the engine since engine exhaust is vented on two sides. The angle of attack of each wing can be altered, preferably by pivoting it about the leading edge to maintain proper alignment with the laminar gas flow. Wing design and structure may vary within known parameters, vortex generators may be provided on the wing surface, dimples or divots may be provided on the wing surface, and the wing and channeling system may be coated with a ceramic or other material. Multiple wings in a biplane configuration may be utilized.

The aerodynamic surface structure assembly is preferably mounted forward of the rear wheels with the plenum venting the gases over the rear wheels after they have passed across the wings, thereby creating a low pressure area immediately forward of the wheels. The down force generated by the wings is preferably directly transferred to the rear wheels through the rear axle rather than through the frame, preferably by mounting the wings on cantilevers positioned on top of the rear axle, with the far ends of the cantilevers fixed to the frame behind the rear wheels.

BRIEF DESCRIPTION OF THE DRAWINGS

FIG. 4 is a top view of an embodiment of the invention showing the aerodynamic surface structure assembly as comprising a pair of housings, with one housing exposed to show the gas exhaust conduits, baffles and wing.

FIG. 5 is a side view of the invention as shown in FIG. 4.

DETAILED DESCRIPTION OF THE INVENTION

Figure 1:
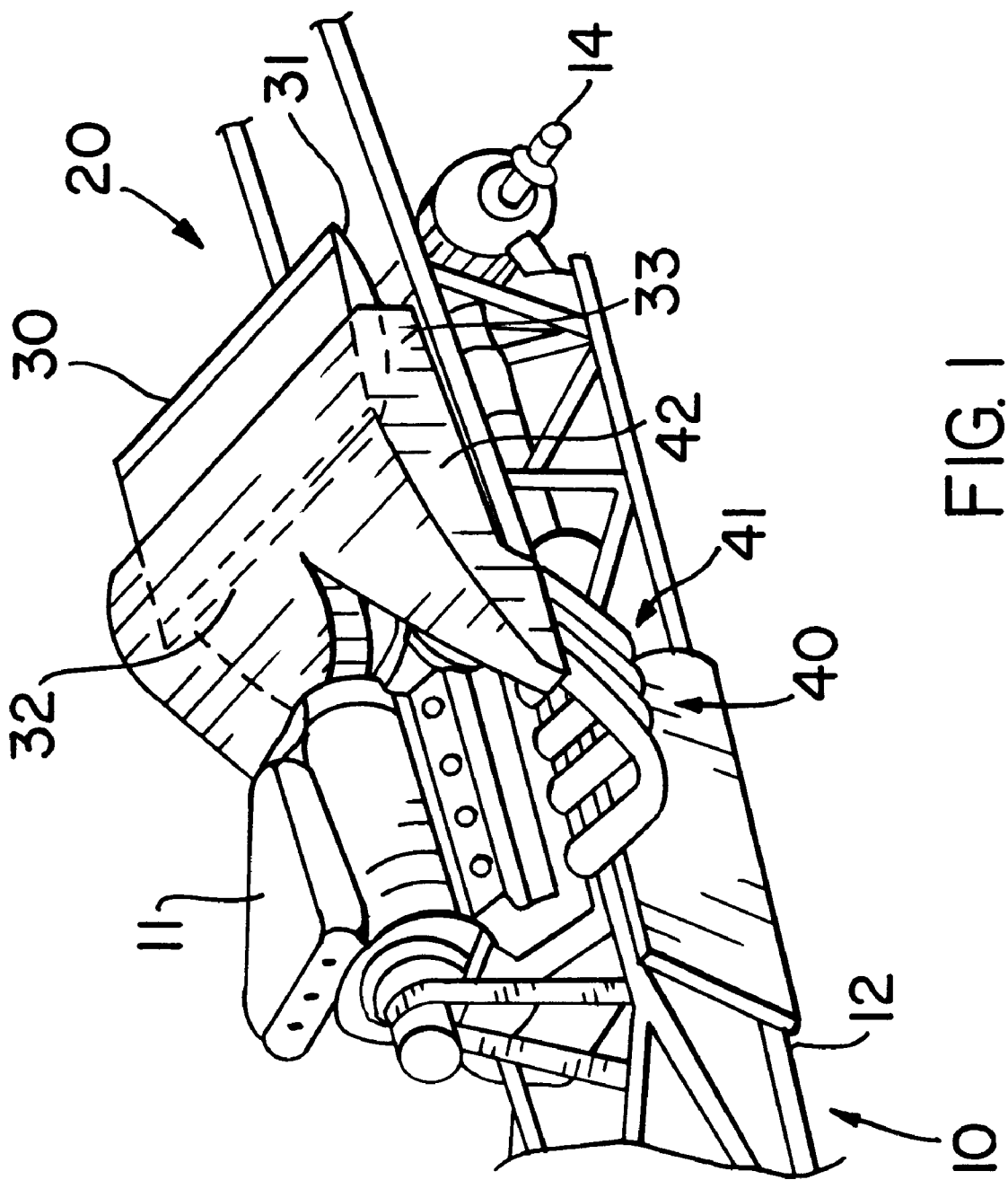
FIG. 1 is a partial perspective view of one embodiment of the invention, shown as having two sets of gas exhaust conduits directing exhaust gas into a single plenum and across a single wing mounted between the tires.

The invention will now be described with reference to the drawings and with regard to providing a best mode and preferred embodiment. As shown in the figures, the invention generally comprises an aerodynamic surface structure assembly 20 mounted onto a drag racing vehicle 10 comprising an engine 11, an extended frame 12, a rear axle 14 and rear tires or wheels 13. The aerodynamic surface structure assembly 20 generally comprises at least one aerodynamic wing surface (a wing, airfoil or canard) 30, engine exhaust gas channeling means 40 and laminar flow creating means 50.

Referring to FIG. 1, a basic embodiment of the invention is shown. Connected to the exhaust ports of the engine 11 on both sides are a set of exhaust gas channeling means 40 which in this embodiment comprise a number of conduit pipes or header pipes 41. The two sets of conduit pipes 41 channel the exhaust gases from the engine 11 into a plenum 42 which extends laterally across the vehicle 10 behind the engine 11 and between the rear wheels 13. The exhaust gases exit the plenum 42 through plenum vent opening 43 and are passed directly across the leading edge 32 of aerodynamic surface wing 30 mounted by mounting means 33 to the frame 12 or rear axle 14. Wing 30 has a cambered surface 31 facing downward, such that the high velocity gases passing across the cambered surface 31 create a down force which presses against the frame 12 of rear axle 14 to increase traction on the rear tires 13.

A specialty racing engine 11 will produce exhaust gas velocities near 1000 feet per second with densities of about 0.0025 slugs (1 lbF-s$^2$/ft) per cubic foot. These values are more than adequate to generate substantial down force along wing 30, based on the generalized lift equation L=(density)(velocity)$^2$(surface area of wing)(coefficient of lift)/2. The overall dimensions, angle of attack and camber of wing 30 are adjusted to control the amount of down force exerted and transferred through the rear wheels 13. Typical wing designs used with subsonic or transonic aircraft will be suitable. Preferably the angle of attack of wing 30 relative to the gas flow is adjusted by pivoting the wing 30 about the leading edge 32, which insures that the leading edge 32 remains at the optimum position. The wing 30 angle of attack may be adjusted electro-mechanically, pneumatically, hydraulically or manually. The wing 30 may be coated with ceramics or other materials to improve heat resistance and drag properties, and can be filled with a material such as sodium for cooling. The wing 30 may contain vortex generators or divots to improve performance.

It is preferred that the exhaust gas flow passing across the wing 30 be laminar, but the flow coming from the engine 11 will be turbulent. Special aerodynamic surface structures 30 could be designed for use with turbulent gas flow, but it is a more practical approach to provide laminar flow creating means 50 to change the turbulent flow to laminar flow just prior to the gas flow striking the leading edge 32 of wing 30. One mechanism for accomplishing this is to provide a number of baffle chambers 51, structures well known in the art, within the exhaust gas channeling means 40, either at the ends of the conduit pipes 41 or plenum 42 just prior to the vent opening 43.

It is also preferred that the length of the exhaust gas channeling means 40 be kept as short as possible, that the wing 30 not be exposed to any free flow of ambient air when the vehicle 10 is in motion, and that the gas flow pass in front of and over the rear wheels 13. Keeping the overall length of the exhaust gas channeling means 40 to a minimum reduces the amount of back pressure which must be overcome by the engine 11. Isolating the wing or wings 30 from the free flow of ambient air prevents the creation of excess down force during the high velocity portion of a race and minimizes drag effects from structural members and the like. Passing the gas flow in front of and over the rear tires 13 creates an area of turbulent flow and low pressure which reduces drag from the tire bodies.

Figure 2:
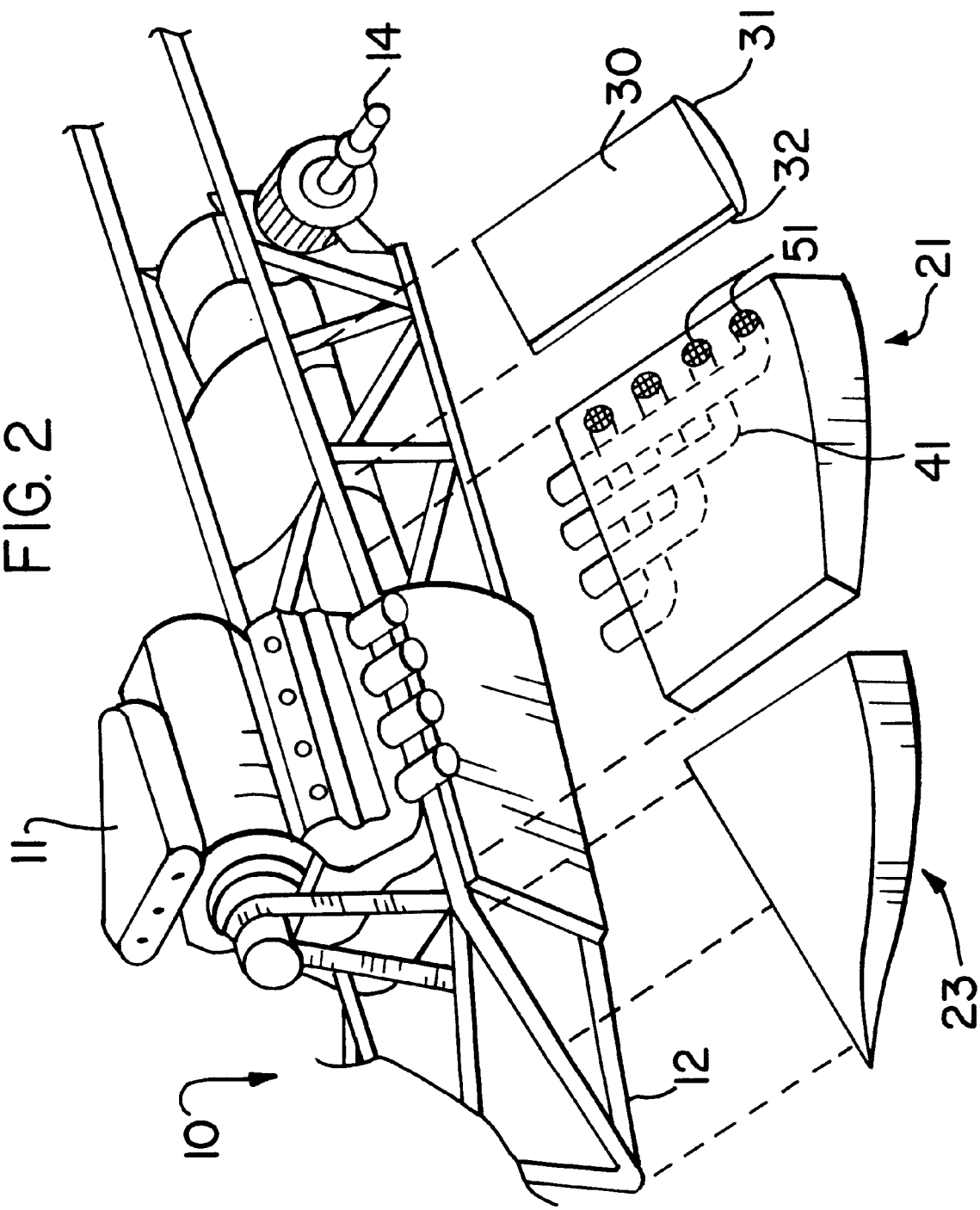
FIG. 2 is a partial perspective view of another embodiment of the invention, shown as having a set of gas exhaust conduits directing exhaust gas through laminar flow creating baffles and across a pair of wings mounted forward of the tires.
Figure 3:
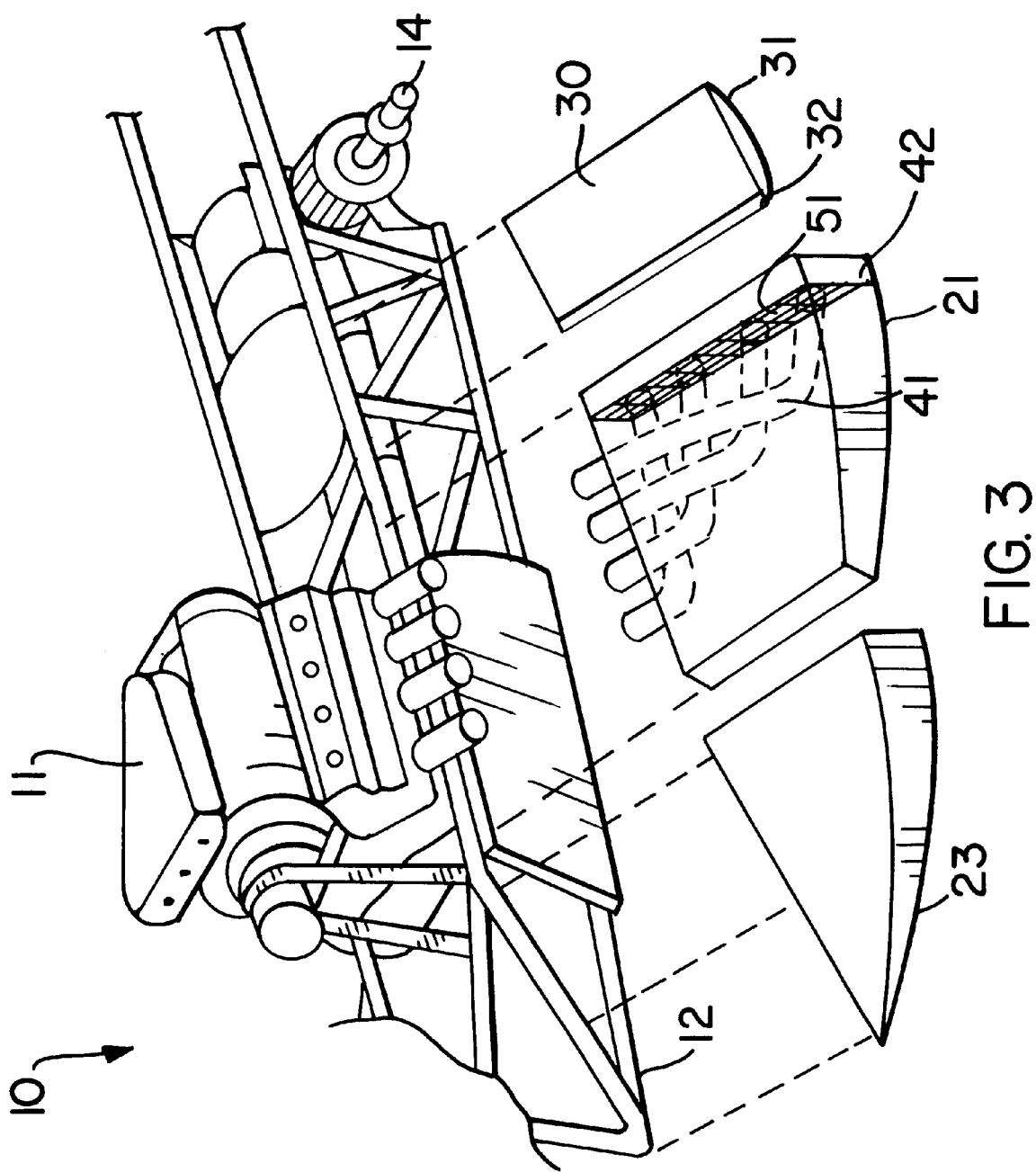
FIG. 3 is a partial perspective view of another embodiment of the invention, shown as having a set of gas exhaust conduits directing exhaust gas into separate plenums containing laminar flow creating baffles and across a pair of wings mounted forward of the tires.

Referring now to FIG. 2, the invention is shown in an embodiment which incorporates a set of wings 30 mounted to the rear and to each side of engine 11. Each set of conduit pipes 41 channels the gas flow from the engine 11 to one wing 30, with laminar flow creating means 50 positioned at the end of each conduit pipe 41 to created the desired air flow pattern. The wings 30 are mounted in front of the rear wheels 13, so that the turbulent flow at the rear of the wing 30 creates an area of low pressure directly in front of the tires 13. For aerodynamic purposes, it is preferred that the conduit pipes 41 be mounted within a sleek housing 21, which may also comprise a tapered leading edge extension 23. FIG. 3 shows a variation on the design of FIG. 2, where the baffles 51 are mounted in a short plenum 42.

A more preferred embodiment is shown in FIGS. 4 and 5, where the entire aerodynamic surface structure assembly 20 comprising a pair of exhaust gas channeling means 40, a pair of aerodynamic surface structure 30 and laminar flow creating means 50 are contained with a pair of housings 21. This design isolates the wings 30 so that no ambient air passes across the cambered surface 31 during the race to cause excess down force which must be overcome by engine power.

Figure 6:
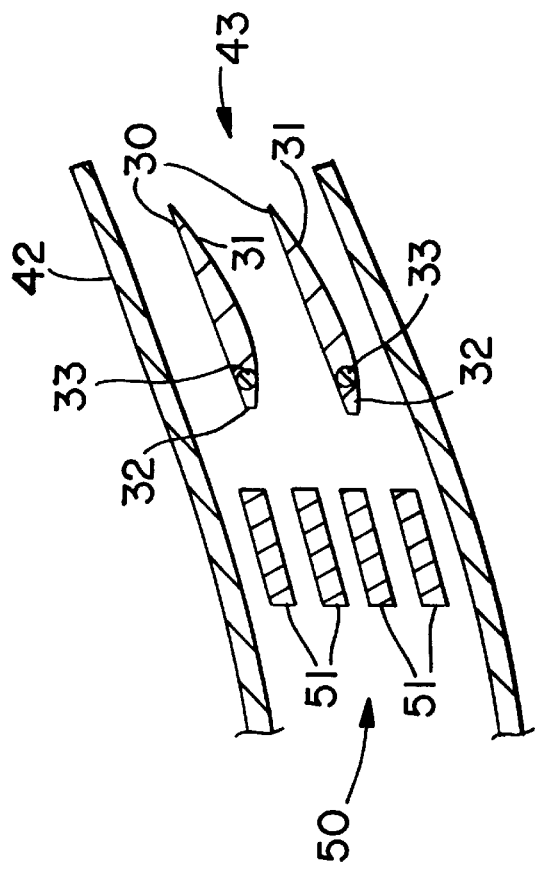
FIG. 6 is a side view of wings in the biplane configuration.

Rather than designing the aerodynamic surface structure assembly on the basis of a single wing 30 or a pair of wings 30, it is also possible to utilize wings 30 mounted vertically one above the other in a biplane configuration, as shown in FIG. 6. With this construction, a high aspect ratio (length/width) can be maintained with shortened wing cord, since the combined surface areas of the cambered surfaces 31 account for the decrease in dimensions of each individual wing 30. This design allows the down force to be maximized without having to spread the exhaust gases over an extended leading wing edge 32, enabling the housing 21 size to be minimized to reduce drag.

Figure 7:
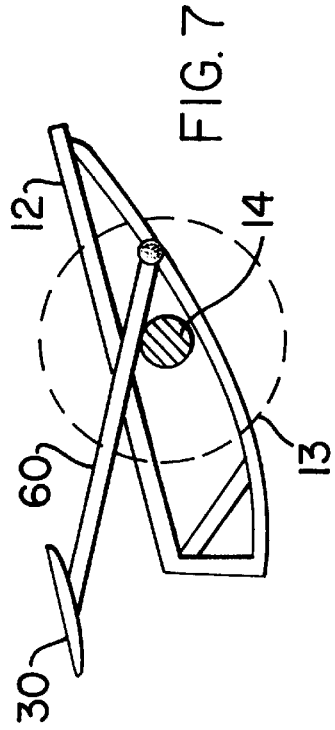
FIG. 7 is a partial side view showing the wing attached to a cantilever abutting the rear wheel axle.

The down force of the wings 30 may be transferred to the rear wheels 13 through mounting means 33 connected to the housing 21, the frame 12 or the rear axle 14. A preferred means for mounting the wings 30 is to utilize a plural number of cantilever mounts 60, as shown in FIG. 7. The rear end of a cantilever mount 60 is fixed to the frame 12 at a point behind the rear wheels 13, such that the cantilever mount rests atop the rear axle 14. The wing 30 is mounted onto the front end of the cantilever mount 60 rather than to the housing 21. As the down force develops on the wing 30, it is transferred directly onto the rear axle 14 by the cantilever mounts 60.

The advantages of the invention should be readily apparent. Once the throttle is actuated to begin the race, high velocity exhaust gas is immediately produced by the engine 11. This high velocity exhaust gas is channeled across the wings 30 and the desirable down force is created almost instantaneously, thereby increasing the rear wheels 13 traction at the starting line and producing a quicker start, since the vehicle 10 can be accelerated more quickly without fear of losing tire traction. As high velocities are obtained, the free flow of ambient air does not pass across the cambered surfaces 21 of the wings 30 because they are contained within housings 21, so no unnecessary excess down force is created. The aerodynamic housings 31, relatively minimum in size compared to the typical large wings with large structural members currently in use, produce little drag.

It is understood that equivalents and obvious substitutions to elements set forth above may be apparent to those skilled in the art. The true scope and definition of the invention therefore is to be as set forth in the following claims.

I claim:

1. A high speed, high acceleration, motorized vehicle comprising an engine which produces high velocity exhaust gases, at least one aerodynamic wing having a leading edge and a cambered surface mounted onto said vehicle such that gases passing across said at least one aerodynamic wing cambered surface create a down force on said vehicle, and exhaust gas channeling means, where said exhaust gas channeling means channels said exhaust gases across said leading edge of said at least one aerodynamic wing cambered surface to create said down force.

2. The vehicle of claim 1, where said engine produces said exhaust gases on two sides, and where said exhaust gas channeling means comprises a plenum which receives said exhaust gases and channels said exhaust gases across a single said aerodynamic wing.

3. The vehicle of claim 1, where said engine produces said exhaust gases on two sides, and where said exhaust gas channeling means comprises a pair of housings which direct said exhaust gases across a pair of said at least one aerodynamic wings.

4. The vehicle of claim 3, where said vehicle has a pair of rear wheels, and where each of said pair of aerodynamic wings is mounted forward of one of said pair of rear wheels.

5. The vehicle of claim 1, where said exhaust gas channeling means further comprises laminar flow creating means which convert said exhaust gas from turbulent flow to laminar flow.

6. The vehicle of claim 1, where said exhaust gas channeling means encloses said at least one aerodynamic wing and prevents ambient air from flowing across said at least one aerodynamic wing.

7. The vehicle of claim 1, where said at least one aerodynamic wing comprises a pair of aerodynamic wings mounted vertically one above the other.

8. The vehicle of claim 1, where said vehicle further comprises a rear axle and where said at least one wing member is mounted onto cantilever mounts which directly contact said rear axle, said at least one wing being mounted in front of said rear axle.

9. An aerodynamic surface structure assembly for creating a down force on a high speed, high acceleration, motorized vehicle having an engine which produces high velocity exhaust gases, said aerodynamic surface structure assembly comprising at least one aerodynamic wing having a leading edge and a cambered surface mounted onto said vehicle such that gases passing across said at least one aerodynamic wing cambered surface create a down force on said vehicle, and exhaust gas channeling means, where said exhaust gas channeling means channels said exhaust gases across said leading edge of said at least one aerodynamic wing cambered surface to create said down force.

10. The assembly of claim 9, where said engine produces said exhaust gases on two sides, and where said exhaust gas channeling means comprises a plenum which receives said exhaust gases and channels said exhaust gases across a single said aerodynamic wing.

11. The assembly of claim 9, where said engine produces said exhaust gases on two sides, and where said exhaust gas channeling means comprises a pair of housings which direct said exhaust gases across a pair of said at least one aerodynamic wings.

12. The assembly of claim 11, where said vehicle has a pair of rear wheels, and where each of said pair of aerodynamic wings is mounted forward of one of said pair of rear wheels.

13. The assembly of claim 9, where said exhaust gas channeling means further comprises laminar flow creating means which convert said exhaust gas from turbulent flow to laminar flow.

14. The assembly of claim 9, where said exhaust gas channeling means encloses said at least one aerodynamic wing and prevents ambient air from flowing across said at least one aerodynamic wing.

15. The assembly of claim 9, where said at least one aerodynamic wing comprises a pair of aerodynamic wings mounted vertically one above the other.

16. The vehicle of claim 9, where said vehicle further comprises a rear axle and where said at least one wing member is mounted onto cantilever mounts which directly contact said rear axle, said at least one wing being mounted in front of said rear axle.

\* \* \* \* \*